(12) United States Patent
Oba

(10) Patent No.: US 8,849,177 B2
(45) Date of Patent: Sep. 30, 2014

(54) IMAGE FORMING SYSTEM AND CONTROL METHOD THEREOF

(75) Inventor: Yoshitaka Oba, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 349 days.

(21) Appl. No.: 12/971,602

(22) Filed: Dec. 17, 2010

(65) Prior Publication Data

US 2011/0150551 A1 Jun. 23, 2011

(30) Foreign Application Priority Data

Dec. 21, 2009 (JP) ................................. 2009-288827

(51) Int. Cl.
*G03G 15/00* (2006.01)
*H04N 1/00* (2006.01)
*G06K 15/02* (2006.01)
*G06F 3/12* (2006.01)

(52) U.S. Cl.
CPC . *H04N 1/00424* (2013.01); *G03G 2215/00109* (2013.01); *G06F 3/1229* (2013.01); *H04N 1/00411* (2013.01); *G06F 3/1205* (2013.01); *H04N 2201/0094* (2013.01); *G06F 3/1285* (2013.01); *G03G 15/502* (2013.01); *H04N 1/00474* (2013.01); *G06F 3/1208* (2013.01); *G06K 15/021* (2013.01); *H04N 1/00435* (2013.01); *H04N 1/00639* (2013.01); *G03G 15/655* (2013.01); *H04N 1/00456* (2013.01); *H04N 1/00482* (2013.01); *G06F 3/1253* (2013.01); *H04N 1/00466* (2013.01); *G03G 2215/00523* (2013.01); *H04N 1/00413* (2013.01)
USPC .......................................... 399/382; 399/407

(58) Field of Classification Search
CPC ................... G03G 15/655; G03G 2215/00523
USPC ................................ 399/382; 358/1.13; 3/382
See application file for complete search history.

(56) References Cited

U.S. PATENT DOCUMENTS

| 4,905,054 | A | * | 2/1990 | Rood | 399/367 |
|---|---|---|---|---|---|
| 5,383,754 | A | * | 1/1995 | Sumida et al. | 412/11 |
| 5,461,459 | A | * | 10/1995 | Muramatsu et al. | 399/15 |
| 6,937,829 | B2 | * | 8/2005 | Sato et al. | 399/82 |
| 7,651,286 | B2 | * | 1/2010 | Tischler | 400/62 |
| 8,215,851 | B2 | * | 7/2012 | Onoda | 400/76 |
| 2001/0026379 | A1 | * | 10/2001 | Collard et al. | 358/488 |
| 2006/0045596 | A1 | * | 3/2006 | Tischler | 400/76 |
| 2007/0201071 | A1 | * | 8/2007 | Yamada et al. | 358/1.13 |
| 2008/0003037 | A1 | * | 1/2008 | Onoda | 400/76 |

FOREIGN PATENT DOCUMENTS

JP 11-298954 A 10/1999
JP 2004-058508 A 2/2004

* cited by examiner

*Primary Examiner* — Matthew G Marini
*Assistant Examiner* — Justin Olamit
(74) *Attorney, Agent, or Firm* — Canon U.S.A., Inc. IP Division

(57) ABSTRACT

An image forming system includes a receiving unit configured to receive a job, an acquisition unit configured to acquire print setting information from the received job, a detection unit configured to detect, when there is a tab sheet print command included in the acquired print setting information, an image orientation and a binding position, a determination unit configured to determine an alignment order of tab sheets based on a relationship between the detected image orientation and binding position, a sheet feeding unit configured to feed a sheet from a tab sheet bundle of the alignment order determined by the determination unit, and a printing unit configured to perform printing on the fed sheet.

9 Claims, 22 Drawing Sheets

| BINDING POSITION | LEFT | TOP | BOTTOM | RIGHT |
|---|---|---|---|---|
| IMAGE ORIENTATION | PORTRAIT | LANDSCAPE | LANDSCAPE | PORTRAIT |
| TAB SHEET | DESCENDING ORDER | ASCENDING ORDER | DESCENDING ORDER | ASCENDING ORDER |

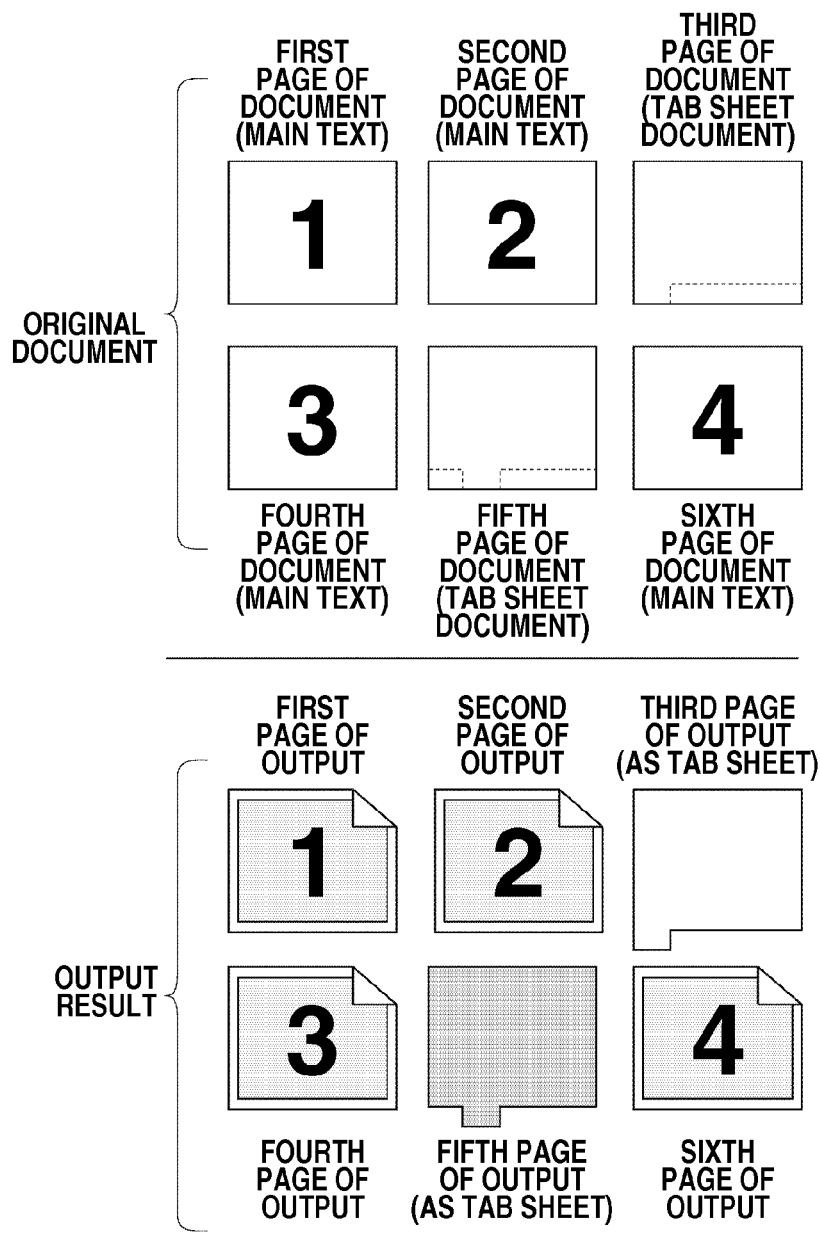

IMAGE FORMING SYSTEM AND CONTROL METHOD THEREOF

BACKGROUND OF THE INVENTION

1. Field of the Invention

The present invention relates to an image forming system that forms an image according to a printing medium, and a control method thereof.

2. Description of the Related Art

Conventionally, a commercial printing firm receives a request to create a printed product (e.g., magazine, news paper, catalogue, advertisement, or gravure) from a customer or a client. The commercial printing firm then creates and delivers the printed product desired by the client and receives payment from the client. Currently, such commercial printing firms mainly use large-scale printing apparatuses such as an offset type printing machine, so that various processes are established in the commercial printing industry. The processes include uploading, design, layout, comprehensive layout (i.e., presentation by printer output), proofing (e.g., layout proofing and color proofing), proof printing, printing plate creation, printing, post processing, and shipping. The printing plate creation is an essential process among the above-described processes, and it is not easy to correct the printing plate once the printing plate is created. Further, it is disadvantageous in terms of cost to correct the printing plate, so that it is necessary to carefully perform proofing, i.e., to check the layout and confirm the colors. Since the above-described large-scale apparatuses and operation processes are necessary for the commercial printing firm to create the printed product desired by the client, a certain amount of time becomes required to create the desired product.

On the other hand, improvements in speed and image quality of electrophotographic and inkjet type printing apparatuses have lead to a growth in a print on demand (POD) market. In contrast to the above-described commercial printing firms, digital image forming apparatuses such as a digital copying machine and a digital multifunction peripheral (MFP) are used in the POD market. The POD market is directed to handling jobs of a comparatively small lot within a short delivery time, without using the large-scale printing apparatus or system. As a result, digital printing employing digital data has become widespread, instead of the printing method employed by the above-described commercial printing firms. There is thus a demand for printers and digital copying machines to have functions equivalent to functions that are often used in commercial printing firms.

Japanese Patent Application Laid-Open No. 2004-058508 discusses an apparatus and a method for printing an index on a tab sheet, i.e., a sheet having an index portion, and inserting the tab sheet in a desired position of the printed product.

However, a precondition for the technique discussed in Japanese Patent Application Laid-Open No. 2004-058508 is to prepare a predetermined tab sheet bundle and then to print on such a bundle. The predetermined tab sheet bundle is a bundle of tab sheets in which the index portions of the tab sheets are aligned in order from the bottom portion of the sheet to the top portion of the sheet (hereinafter referred to as an ascending order type tab sheet bundle). Further, the index portions are aligned in order from the top portion to the top bottom of the sheets (hereinafter referred to as a descending order type tab sheet bundle). It is thus not suitable to perform continuous printing of the printed output, and it becomes necessary to reset printing sheets for each print job. Further, if both of the ascending order type sheet bundle and the descending order type sheet bundle are stored in the digital image forming apparatus for performing continuous printing, the wrong tab sheet bundle may be fed when an automatic sheet selection is set.

Furthermore, if the tab sheet bundle runs out during printing, sheet feeding stages inside the image forming apparatus are searched using "tab sheet" as a keyword, so that the image forming apparatus may continuously feed the wrong tab sheet bundle. It is thus desirable to solve such problems and improve user-friendliness.

SUMMARY OF THE INVENTION

According to an aspect of the present invention, an image forming system includes a receiving unit configured to receive a job, an acquisition unit configured to acquire print setting information from the received job, a detection unit configured to detect, when there is a tab sheet print command included in the acquired print setting information, an image orientation and a binding position, a determination unit configured to determine an alignment order of tab sheets based on a relationship between the detected image orientation and binding position, a sheet feeding unit configured to feed a sheet from a tab sheet bundle of the alignment order determined by the determination unit, and a printing unit configured to perform printing on the fed sheet.

According to an exemplary embodiment of the present invention, when a user is to create a complex printed output using the tab sheets, a type of the tab sheet bundle stored in the image forming apparatus is automatically selected. The correct tab sheet bundle appropriate for print data can thus be fed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 17A and 17B illustrate output results of inserted tab sheet printing.

DESCRIPTION OF THE EMBODIMENTS

Various exemplary embodiments, features, and aspects of the invention will be described in detail below with reference to the drawings.

Figure 1:
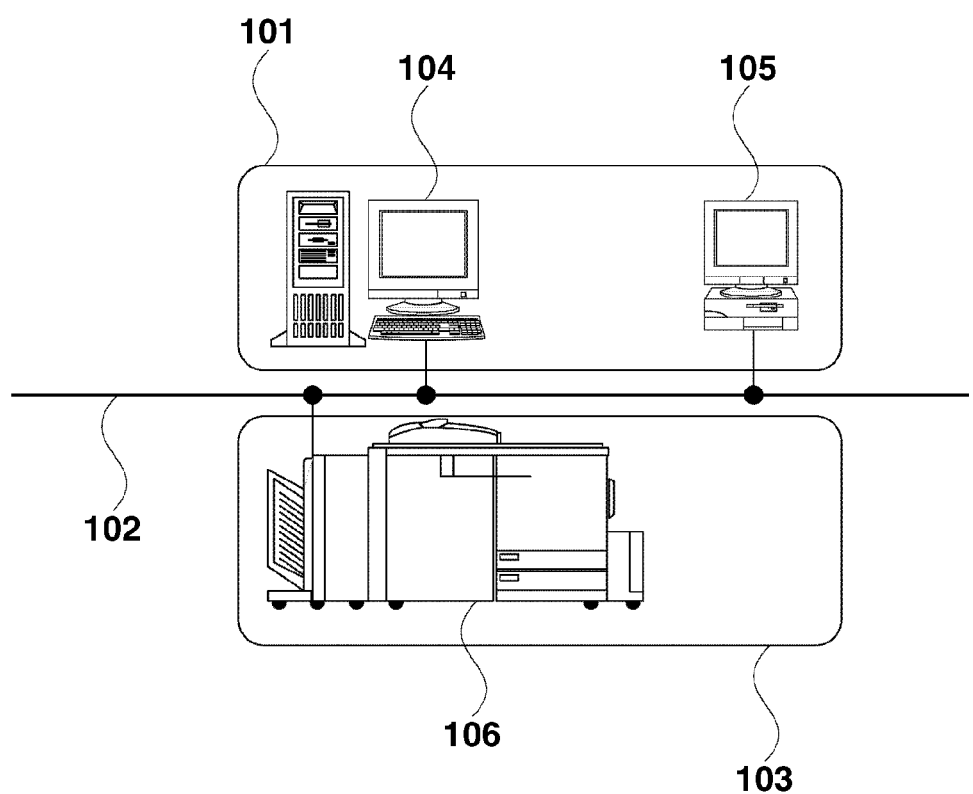
FIG. 1 illustrates an entire system according to an exemplary embodiment of the present invention.

FIG. 1 illustrates an entire system according to an exemplary embodiment of the present invention. Referring to FIG. 1, the system includes one or a plurality of end user environments 101 and a print environment 103, connected with each other via a network 102. The end user environment 101 includes client PCs (i.e., an end user environment A 104 and an end user environment B 105). The print environment 103 includes an image forming apparatus 106 having a document reading apparatus. The end user environment A 104 and the end user environment B 105 are used by the user to create and output document data, confirm an output status of the document data being output, and correct the document.

Data may be input to the image forming apparatus 106 by the following methods. A paper document read by the document reading apparatus is input to the image forming apparatus 106 as document/image data, or the image forming apparatus 106 receives the document data created by the user using the end user environment 101. Further, the image forming apparatus 106 includes functions for performing, when outputting the document data stored therein, image correction, file merging, page inserting and deleting, various page layout editing, and imposition. Furthermore, the image forming apparatus 106 includes functions for performing, when outputting the document data, finishing such as sheet folding, saddle stitch bookbinding, case binding, cutting, inserting, and collating with respect to an output recording medium. The image forming apparatus 106 performs such finishing according to an operation instruction included in the print job. A printed product is thus output by inputting the document data created by the user in the end user environment 101 and the image forming apparatus 106 including the document reading apparatus.

Figure 2:
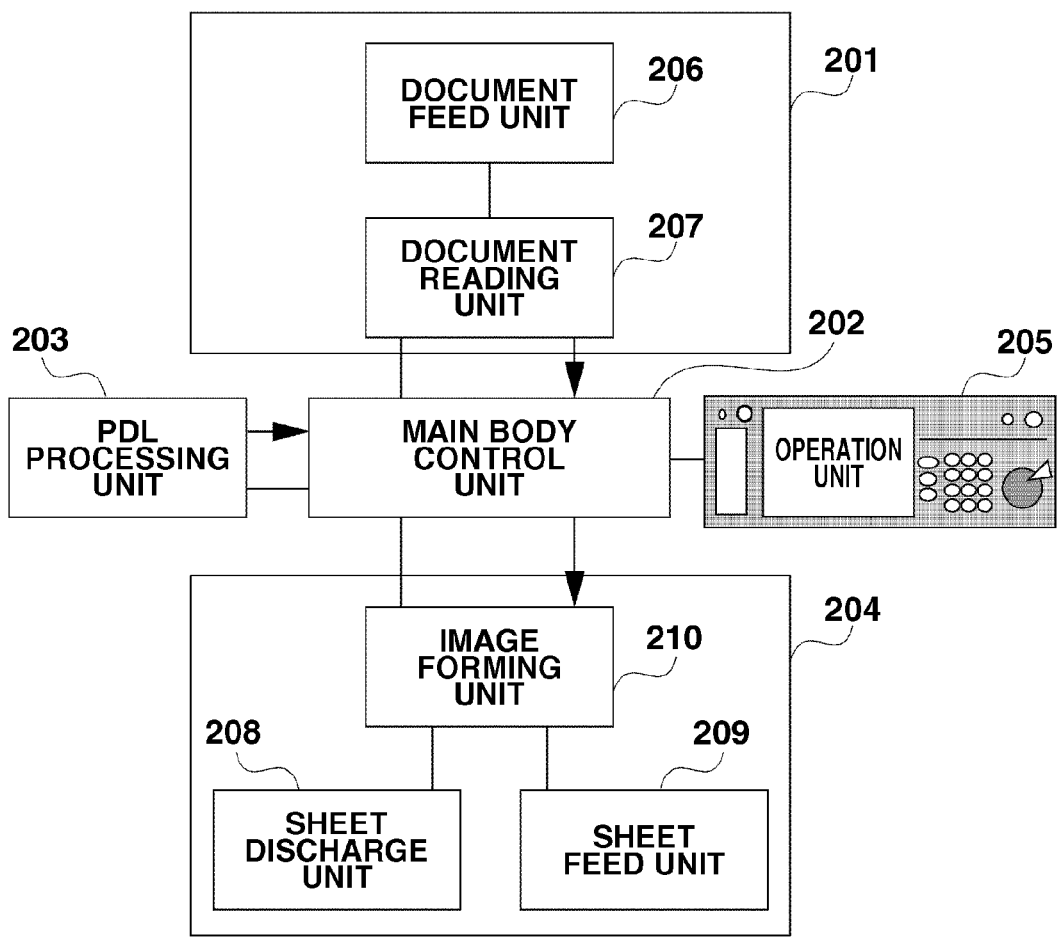
FIG. 2 is a block diagram illustrating a configuration of a print environment.

FIG. 2 is a block diagram illustrating a configuration of the print environment 103. Referring to FIG. 2, the print environment 103 includes a scanning unit 210, a main body control unit 202, a page description language (PDL) processing unit 203, an image output unit 204, and an operation unit 205. Further, the scanning unit 201 includes a document feeding unit 206 and a document reading unit 207. The image output unit 204 includes a sheet discharge unit 208, a sheet feeding unit 209, and an image forming unit 210.

The scanning unit 201 reads using the document reading unit 207 the document that the user has set on the document feeding unit 206, according to a copy/image forming instruction that the user has input from the operation unit 205. The main body control unit 202 controls driving of the scanning unit 201 and the image output unit 204. Further, the main body control unit 202 includes a function for controlling programs for executing various modes to be described below. Upon receiving the PDL data created by the end user environment 101, the PDL processing unit 203 creates the print data from the received PDL data.

The image output unit 204 performs, when outputting the document and the image data read by the scanning unit 201 or print data generated by the PDL processing unit 203, image correction, file merging, page inserting and deleting, and various imposition. The image output unit 204 performs such processing according to the operation instruction added to the data. The image output unit 204 then causes the sheet discharge unit 208 and the sheet feeding unit 209 to operate and thus output the data to the recording medium. At the same time, the image output unit 204 performs finishing such as sheet folding, saddle stitch bookbinding, case binding, cutting, inserting, and collating with respect to the recording medium, according to the operation instruction.

The operation unit 205 is an operation unit of the image forming apparatus according to the present exemplary embodiment. The image forming apparatus 106 controls the entire system by transmitting to the main body control unit 202 key information input to the operation unit 205.

Figure 3:
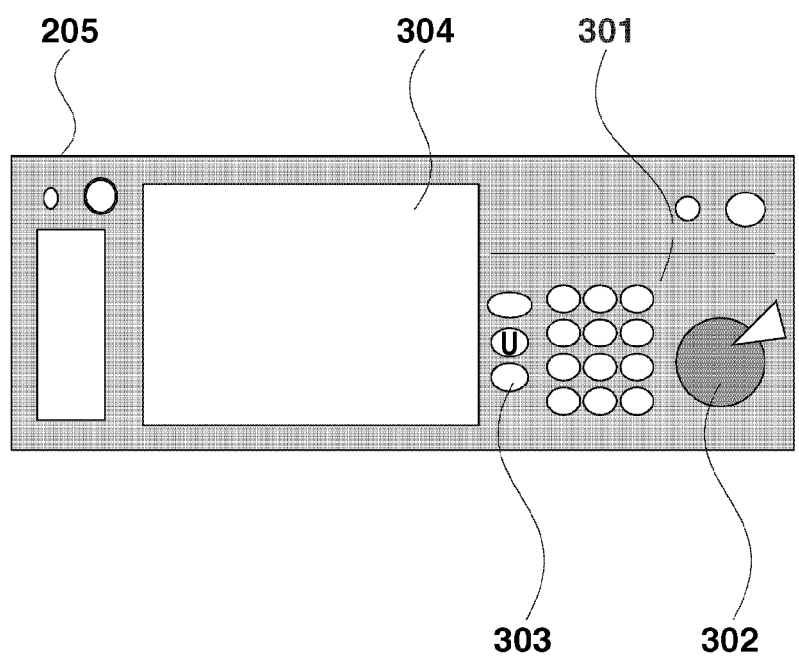
FIG. 3 is a plane view illustrating a configuration of an operation unit.

FIG. 3 is a plane view illustrating a configuration of the operation unit 205. Referring to FIG. 3, a numeric key pad 301 is used for inputting a number of copies, displacement of an image, and setting values. A start key 302 is used for starting copying or other various functions. A user mode key 303 is used for selecting various settings to be added to a default mode of the image forming apparatus 106. A liquid crystal display (LCD) screen 304, which includes a touch panel function on the front surface, displays a mode added to a print job or an operation status of the entire apparatus.

Figure 4A:
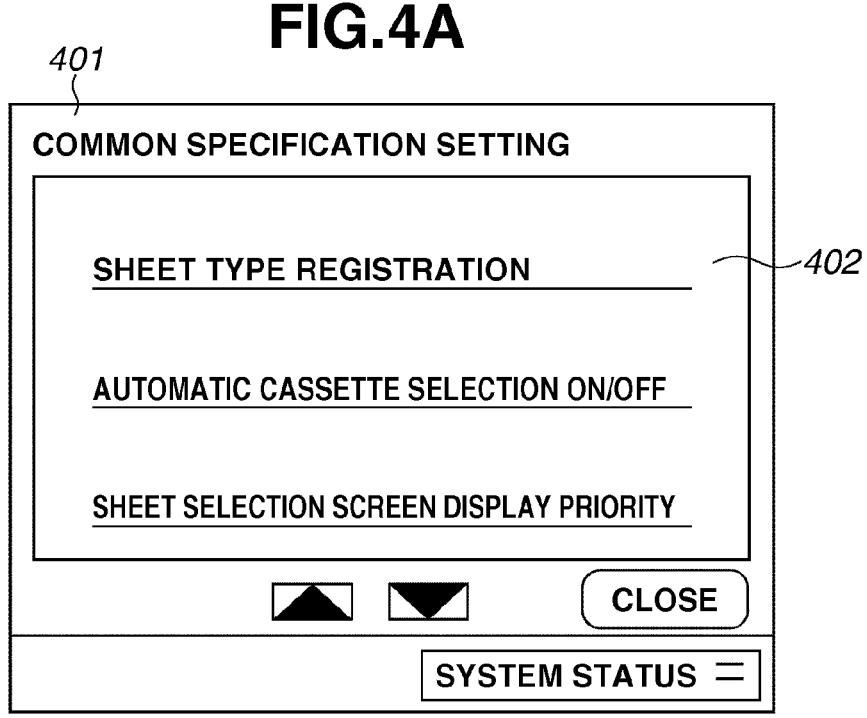
FIGS. 4A, 4B, 4C, and 4D illustrate a tab sheet registration setting 1.

FIGS. 4A, 4B, 4C, and 4D illustrate tab sheet registration setting in the print environment 103. More specifically, FIG. 4A illustrates a tab sheet registration setting details screen in the print environment 103 in which each of various settings is grouped and which includes a setting item list 401 and a sheet type registration setting key 402. The sheet type registration setting key 402 is a button for selecting the setting item from the setting item list 401. When the main body control unit 202 detects that the user has pressed the sheet type registration setting key 402, the registration of the recording medium is started. The main control unit 202 then switches the screen on the operation unit 205 to a tab sheet feed stage selection setting details screen illustrated in FIG. 4B to be described below.

Figure 4B:
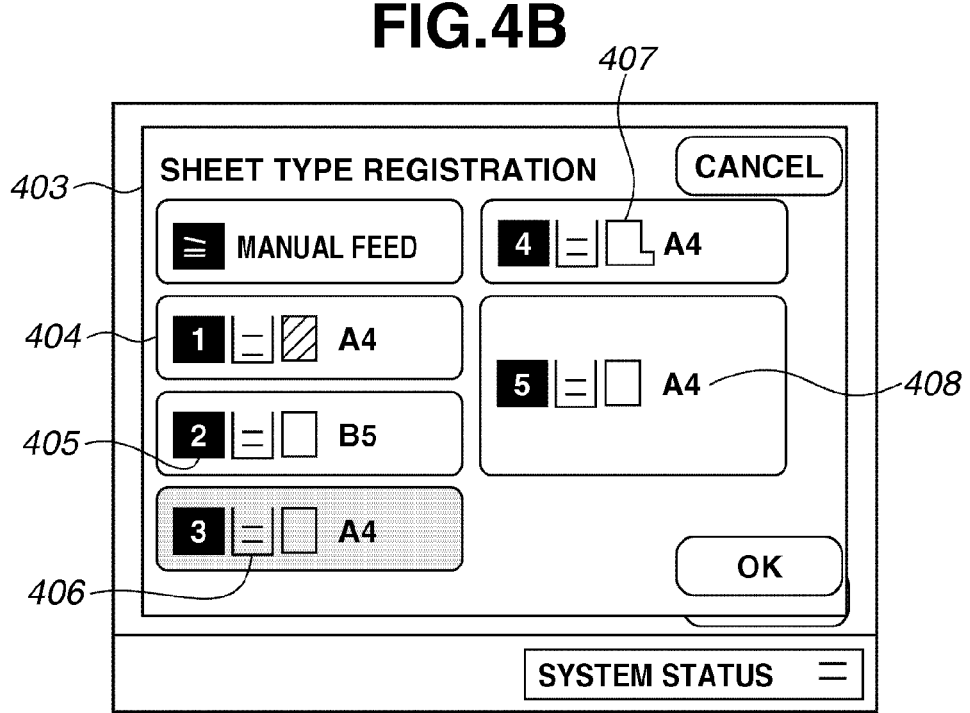

Referring to FIG. 4B, the tab sheet feed stage selection setting details screen is configured of a sheet feed setting item list 403 including keys 404 that indicate sheet feed stage units in the image forming apparatus 106. The sheet feed setting item list 403 thus displays a list of the sheet feed stage units. Each of the keys 404 displays a sheet feed stage unit number 405, a remaining amount of sheets in the sheet feed stage unit 406, a type of sheets set in the feed stage unit 407, and a size of sheets set in the sheet feed stage unit 408. When the recording media are set in the sheet feed stage unit, a sensor in the sheet feed stage unit measures the recording media and displays the measured values as the remaining amount of sheets set in the sheet feed stage unit 406 and the size of sheets set in the sheet feed stage unit 408. Upon detecting that the user has pressed one of the keys 404, the main body control unit 202 starts the operation for assigning the type of sheet to the desired sheet feed stage unit. The main body control unit 202 then switches the screen on the operation unit 205 to a sheet type registration setting details screen illustrated in FIG. 4C described below.

Figure 4C:
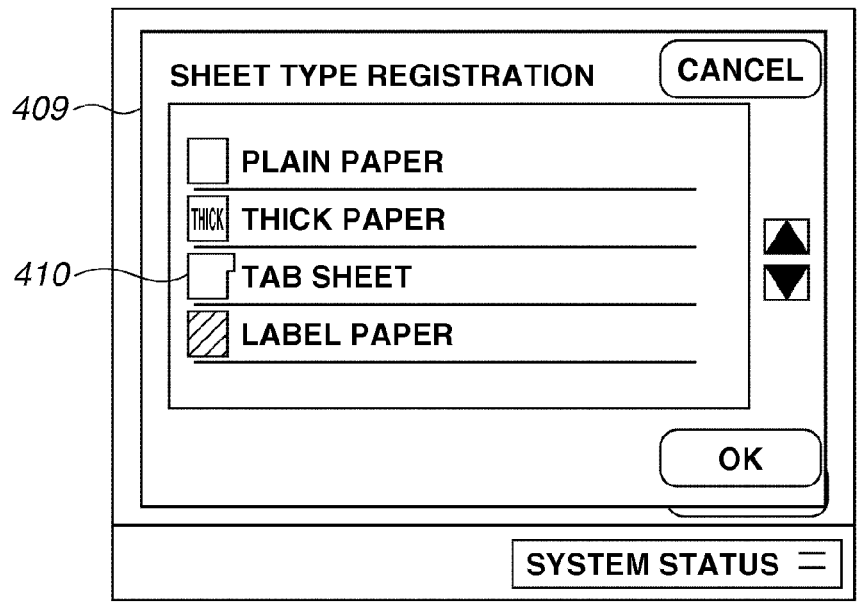

Referring to FIG. 4C, the sheet type registration setting details screen is configured of a sheet type registration selection screen list 409 including types of sheets that can be assigned 410. The sheet type registration selection screen list 409 thus displays the sheet types that can be registered. Upon detecting that the user has selected one of the types of sheets that can be assigned 410, the main body control unit 202 assigns the type of sheet to the sheet feed stage unit. The main body control unit 202 then switches the screen on the operation unit 205 to a number-of-tabs registration setting details screen illustrated in FIG. 4D described below.

Figure 4D:
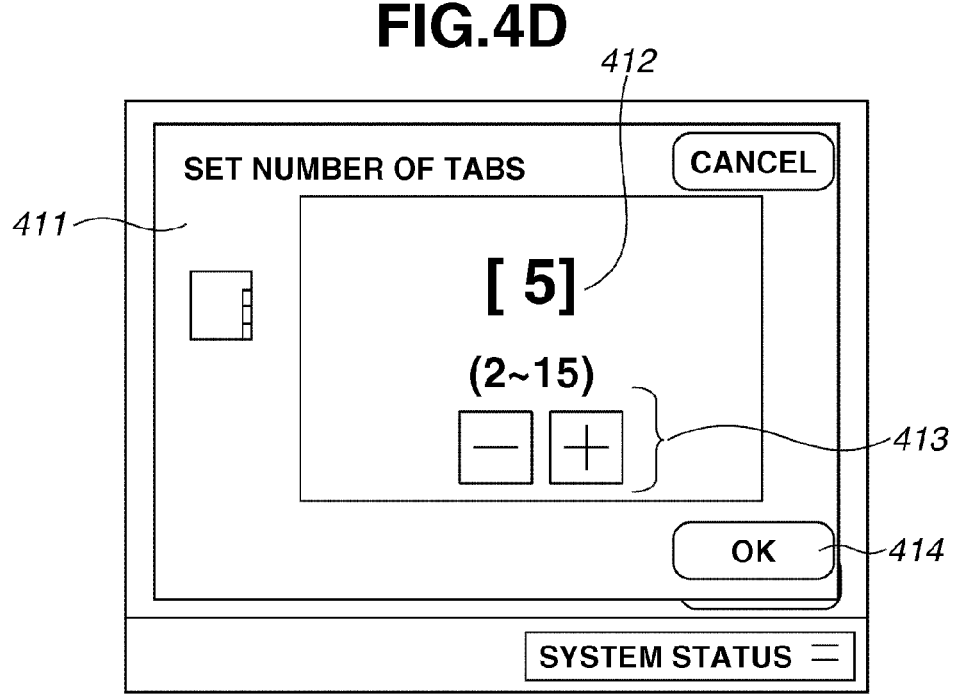

Referring to FIG. 4D, the number-of-tabs registration setting details screen is configured of a number-of-tabs registration screen 411 that displays a number-of-tabs 412 indicating an input value, input keys 413, and an OK key 414. The number-of-tabs registration screen 411 is a screen for the user to input the number of tabs. Upon detecting number-of-tabs information input by the user using the input keys 413, the main body control unit 202 registers the information as tab information of the tab sheet. When the main body control unit 202 then detects that the user has pressed the OK key 414, the main body control unit 202 switches the screen on the operation unit 205 to a tab width registration setting details screen illustrated in FIG. 5A described below.

Figure 5A:
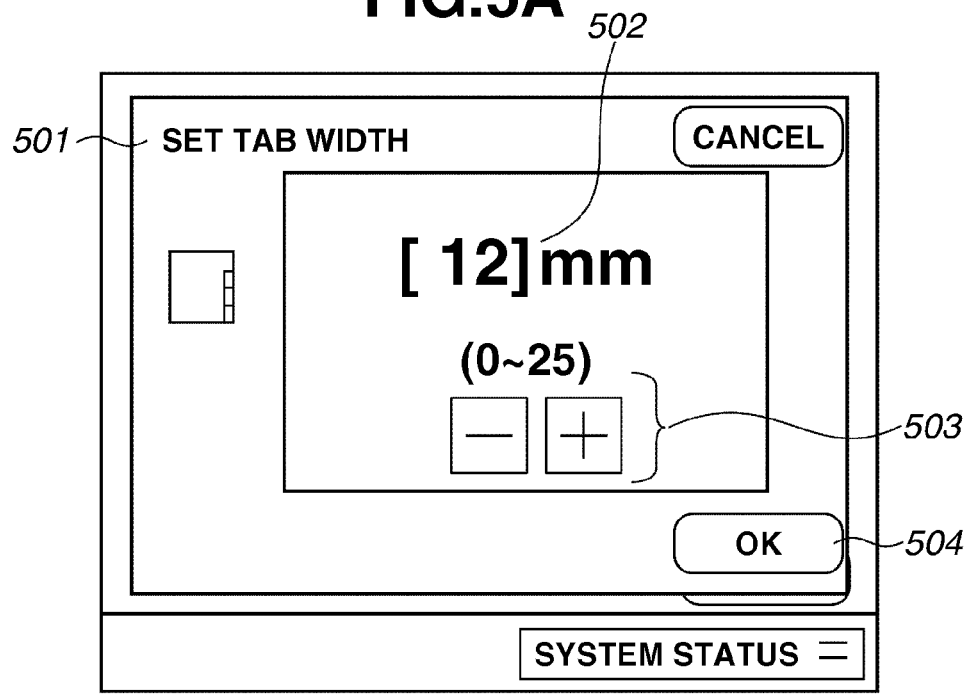
FIGS. 5A and 5B illustrate a tab sheet registration setting 2.

Referring to FIG. 5A, the tab width registration setting details screen is configured of a tab width registration screen 501 that displays a tab width 502 indicating the input value, input keys 503, and an OK key 504. The tab width registration screen 501 is a screen for the user to input the tab width. The main body control unit 202 detects tab width information that the user has input using the input keys 503 and registers the information as the tab information of the tab sheet. When the main body control unit 202 then detects that the user has pressed the OK key 504, the main body control unit 202 switches the screen on the operation unit 205 to a tab order registration setting details screen illustrated in FIG. 5B described below.

Figure 5B:
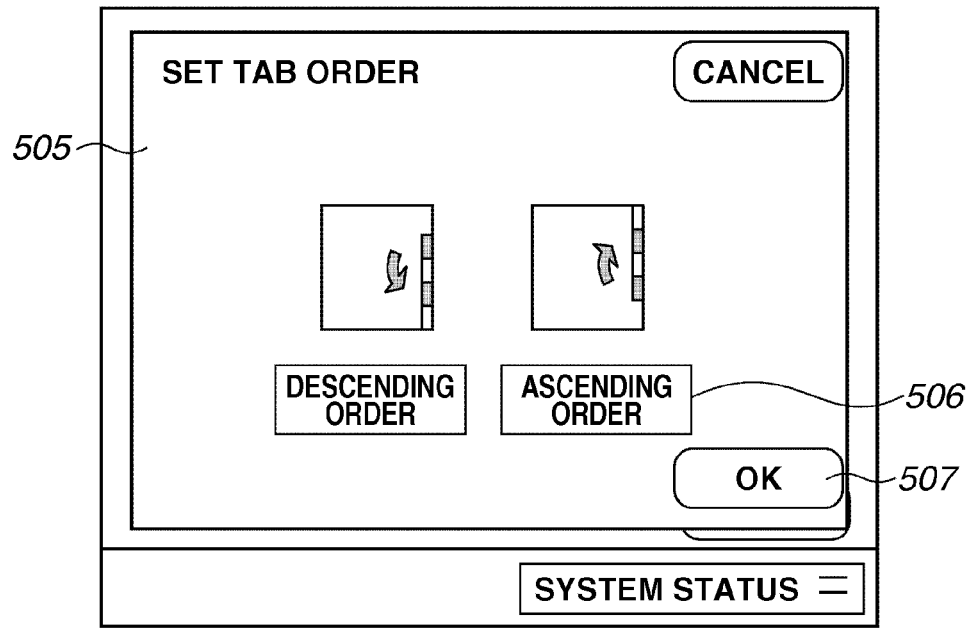

Referring to FIG. 5B, the tab order registration setting details screen is configured of a tab order registration screen 505 including input keys 506 and an OK key 507. The tab order registration screen 505 is a screen for the user to input the alignment order of tabs. The main body control unit 202 detects tab order information that the user has input using the input keys 506 and registers the information as the tab information of the tab sheet. When the main body control unit 202 then detects that the user has pressed the OK key 507, the main body control unit 202 ends the registration.

Figure 6A:
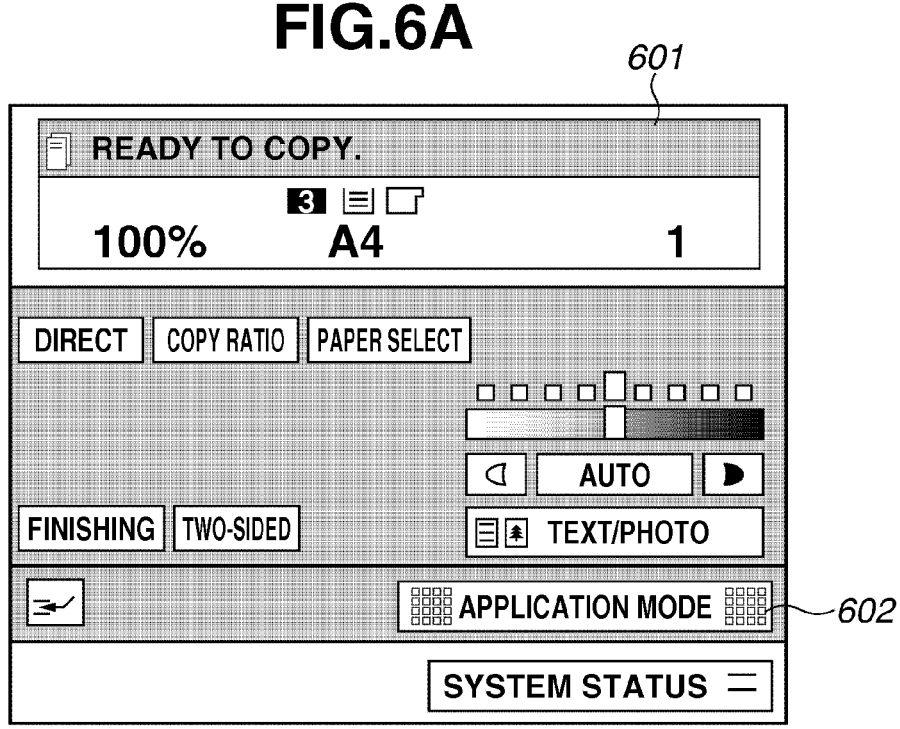
FIGS. 6A, 6B, 6C, and 6D illustrate a tab sheet print setting 1 in a copy mode.

FIGS. 6A, 6B, 6C, 6D, and 7 illustrate tab sheet print settings in a copy mode. More specifically, FIG. 6A illustrates a copy print setting details screen. Referring to FIG. 6A, the copy print setting details screen is configured of a default screen 601 and an application mode button 602. The default screen 601 is a copy mode setting screen. Upon detecting that the user has pressed the application mode button 602, the main body control unit 202 displays a special printing setting screen. The main body control unit 202 then switches the screen on the operation unit 205 to an application print setting details screen illustrated in FIG. 6B described below.

Figure 6B:
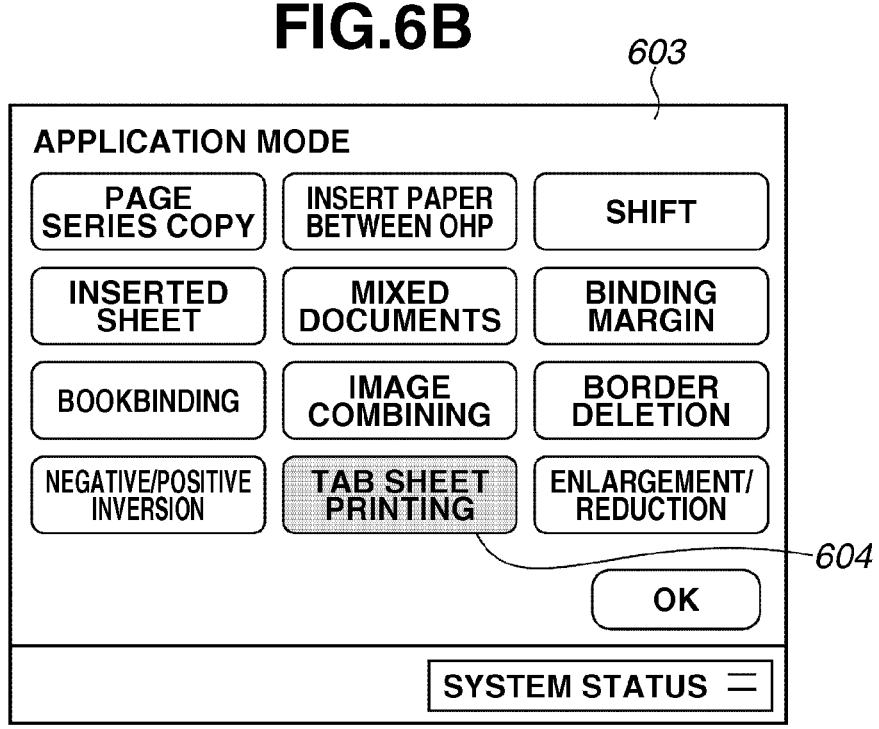

Referring to FIG. 6B, the application print setting details screen is configured of an application mode screen 603 including a tab sheet print setting key 604. The application mode screen 603 also includes details setting buttons for specifying image correction, file merging, page inserting and deleting, various page layout editing, and imposition. Upon detecting that the user has pressed the tab sheet print setting key 604 among the above-described setting keys, the main body control unit 202 displays the screen for specifying various detailed settings of the tab sheet. The main body control unit 202 then switches the screen on the operation unit 205 to a tab sheet print setting details screen illustrated in FIG. 6C described below.

Figure 6C:
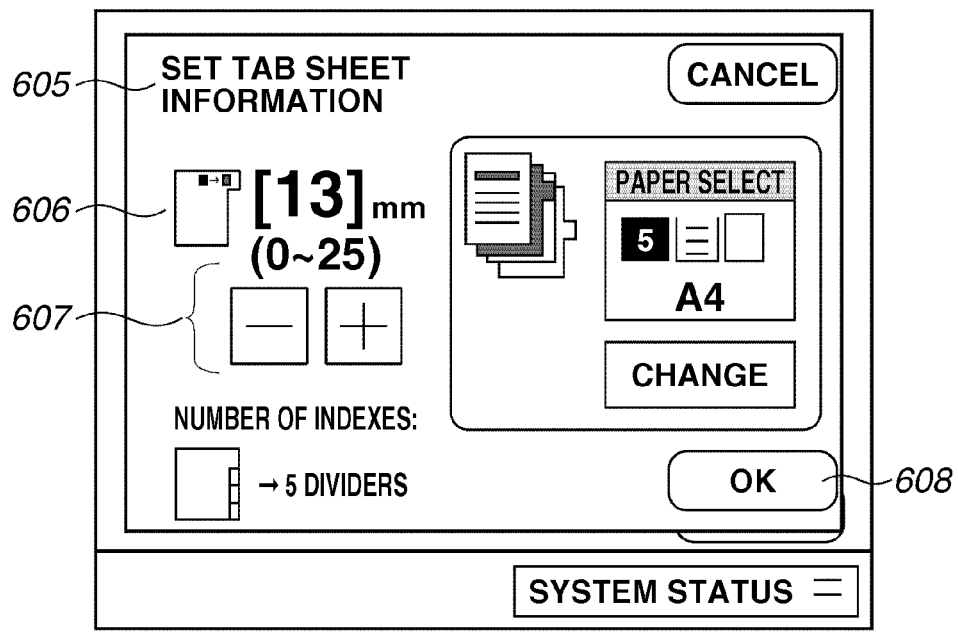

Referring to FIG. 6C, a tab sheet print setting details screen 605, which displays a tab width 606, is configured of input keys 607 and an OK key 608. The user inputs the tab settings using the display of the tab width 606 and the input keys 607 in the tab sheet print setting details screen 605. Upon detecting such user input, the main body control unit 202 stores the tab settings as information to be used in processing the document image read by the scanning unit 201 for printing the document on the tab portion of the tab sheet. After detecting that the user has pressed the OK key 608, the main body control unit 202 switches the screen on the operation unit 205 to a tab order registration setting details screen illustrated in FIG. 6D described below.

Figure 6D:
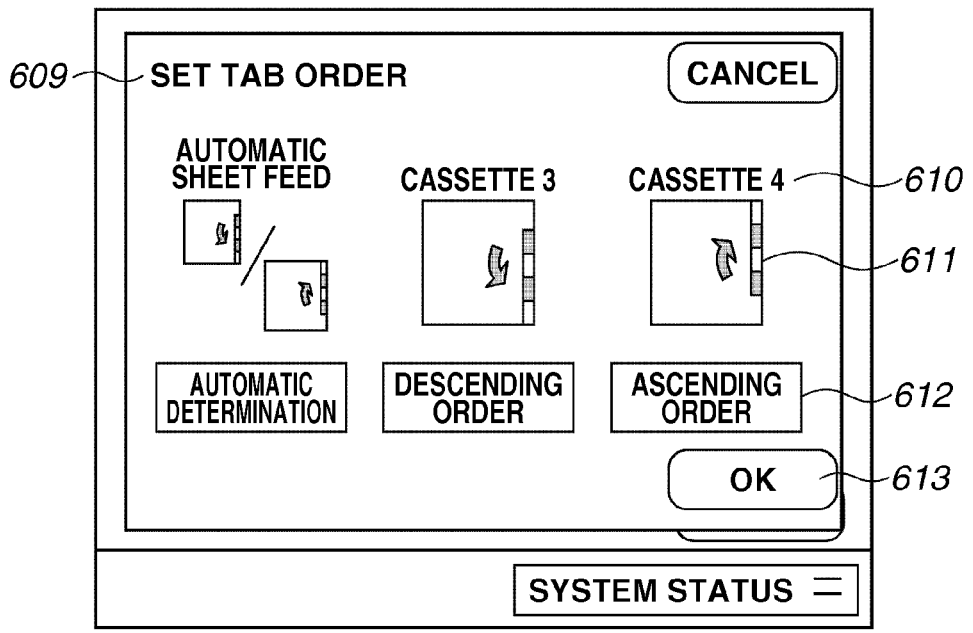

Referring to FIG. 6D, a tab order setting details screen 609 displays sheet feed stages in which tab sheets are set 610 and selectable tab sheets 611, and is configured of selection buttons 612 and an OK button 613. The tab order setting details screen 609 is a screen for the user to select the type of tab sheet to be used in printing. The main body control unit 202 displays the information stored in the image forming apparatus 106 as the sheet feed stages in which tab sheets are set 610 and the selectable tab sheets 611. Upon detecting that the user has pressed one of the selection buttons 612, the main body control unit 202 sets the selected tab order of the tab sheets. When the main body control unit 202 detects that the user has pressed the OK key 613, the main body control unit 202 ends the registration. Upon detecting that the user has pressed the start key 302 on the operation unit 205, the image forming apparatus 106 starts printing on the tab sheets. If the tab sheets selected by the user are not set in the image forming apparatus 106, the main body control unit 202 switches, when detecting that the user has pressed one of the selection buttons 612, the screen displayed on the operation unit 205 to a "no printable sheets available" details screen illustrated in FIG. 7.

Figure 7:
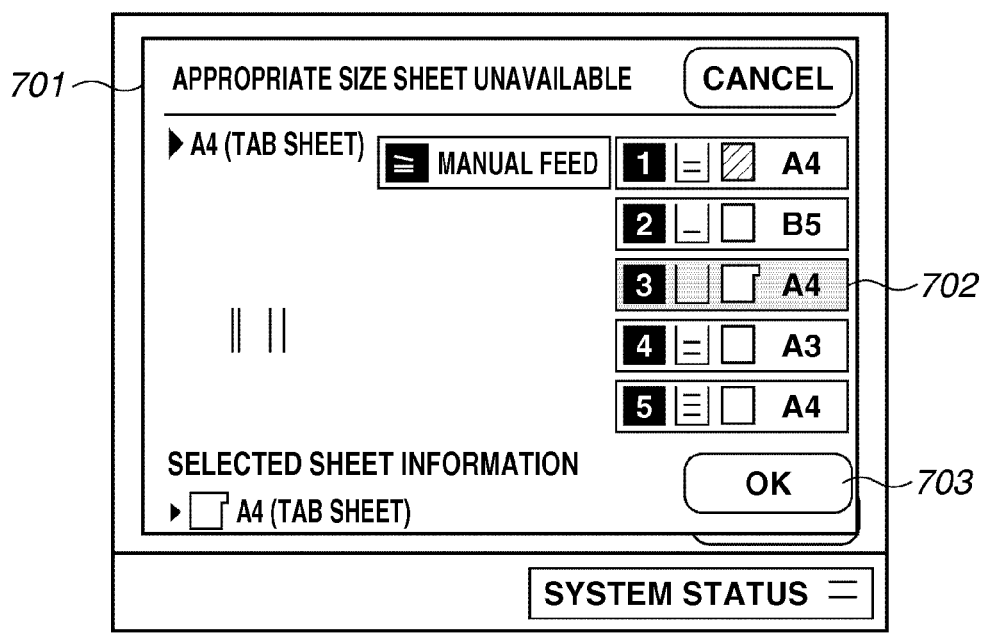
FIG. 7 illustrates a screen displaying that no printable sheets are available.

FIG. 7 illustrates a "no printable sheets available" details screen. A "no printable sheets available" details screen 701 is configured of sheet feed stage unit information display buttons 702 and an OK button 703. The "no printable sheets available" details screen 701 displays to the user all pieces of sheet information stored in the image forming apparatus 106. The user may then select one of the sheet feed stage unit information display buttons 702 to use substitute sheets stored in the image forming apparatus 106. Upon detecting that the user has pressed one of the sheet feed stage unit information display buttons 702 for using the substitute sheets, the main body control unit 202 rewrites the sheet feed stage information, changes the sheet feed stage unit, and continues printing.

Figures 8A, 8B:
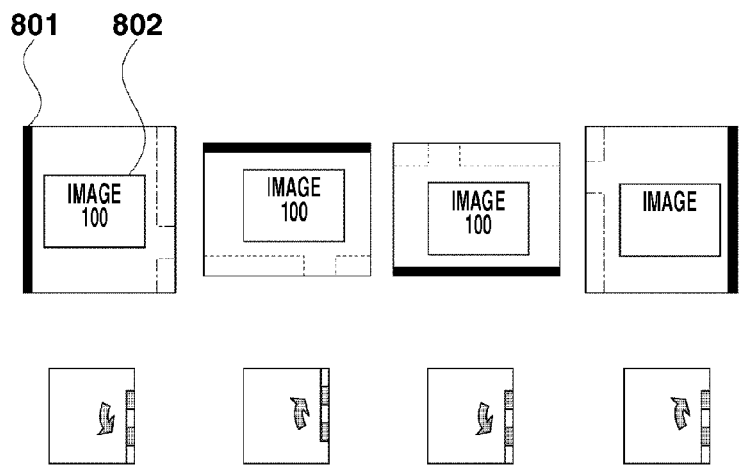
FIGS. 8A and 8B illustrate a tab sheet determination process.

FIGS. 8A and 8B illustrate a tab sheet determination process. Referring to FIGS. 8A and 8B, upon detecting that the user has selected automatic determination using the selection buttons 612 illustrated in FIG. 6D, the main body control unit 202 detects a binding position 801 and an image orientation 802 of the data to be printed on the tab sheet. The main body control unit 202 then detects and compares the positional relation using the detected data. If the binding position is on a left end and the image orientation is a portrait orientation, or the binding position is at the bottom and the image orientation is a landscape orientation with respect to the sheet, the main control unit 202 instructs the image forming apparatus 106 to use a descending order tab sheet bundle. On the other hand, if the binding position is at the top and the image orientation is the landscape orientation, or the binding position is on a right end and the image orientation is the portrait orientation with respect to the sheet, the main control unit 202 instructs the image forming apparatus 106 to use an ascending order tab sheet bundle.

The control process performed by the image forming apparatus system according to the first exemplary embodiment of the present invention will be described below with reference to flowcharts illustrated in FIGS. 9, 10, and 11.

Figure 9:
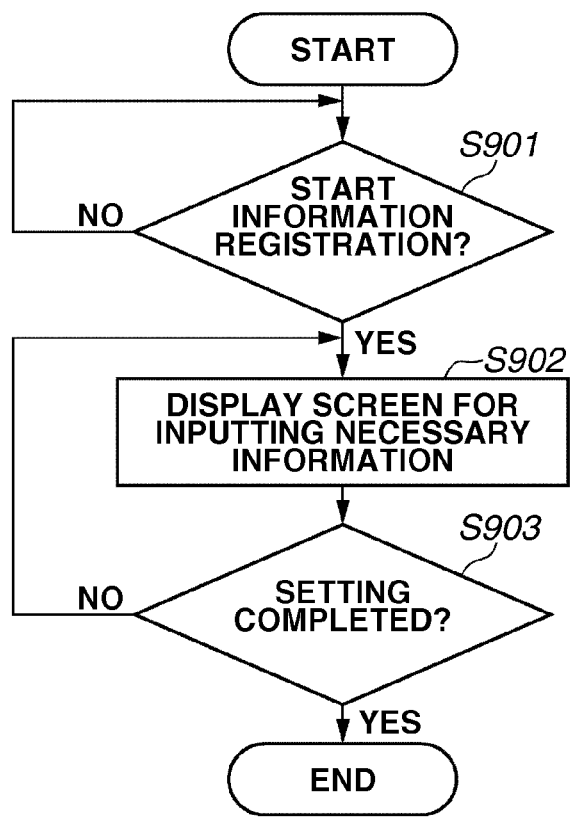
FIG. 9 is a flowchart illustrating a tab sheet registration process.

FIG. 9 is a flowchart illustrating a process for registering the tab sheet information in the image forming apparatus 106. In step S901, the main body control unit 202 waits for the user to input the tab sheet information to the operation unit 205. If the main body control unit 202 detects that the user has started inputting the information (YES in step S901), the process proceeds to step S902. In step S902, the main body control unit 202 displays on the operation unit 205 the screen for inputting the information that is necessary for the registration. In step S903, if it is determined that the user has input all pieces of the information that is necessary for the registration (YES in step S903), the information registration ends.

Figure 10:
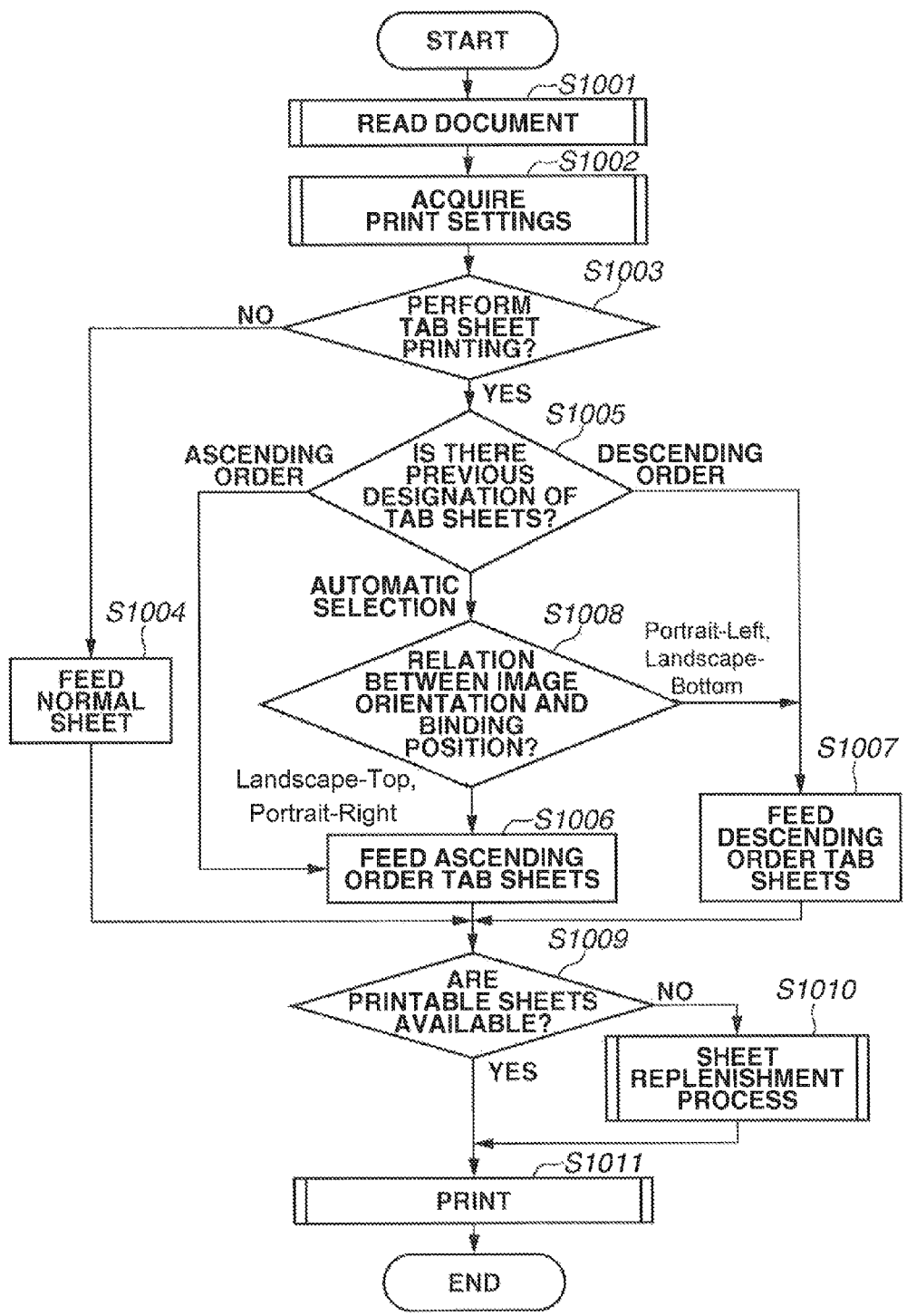
FIG. 10 is a flowchart illustrating a tab sheet printing process.
Figure 11:
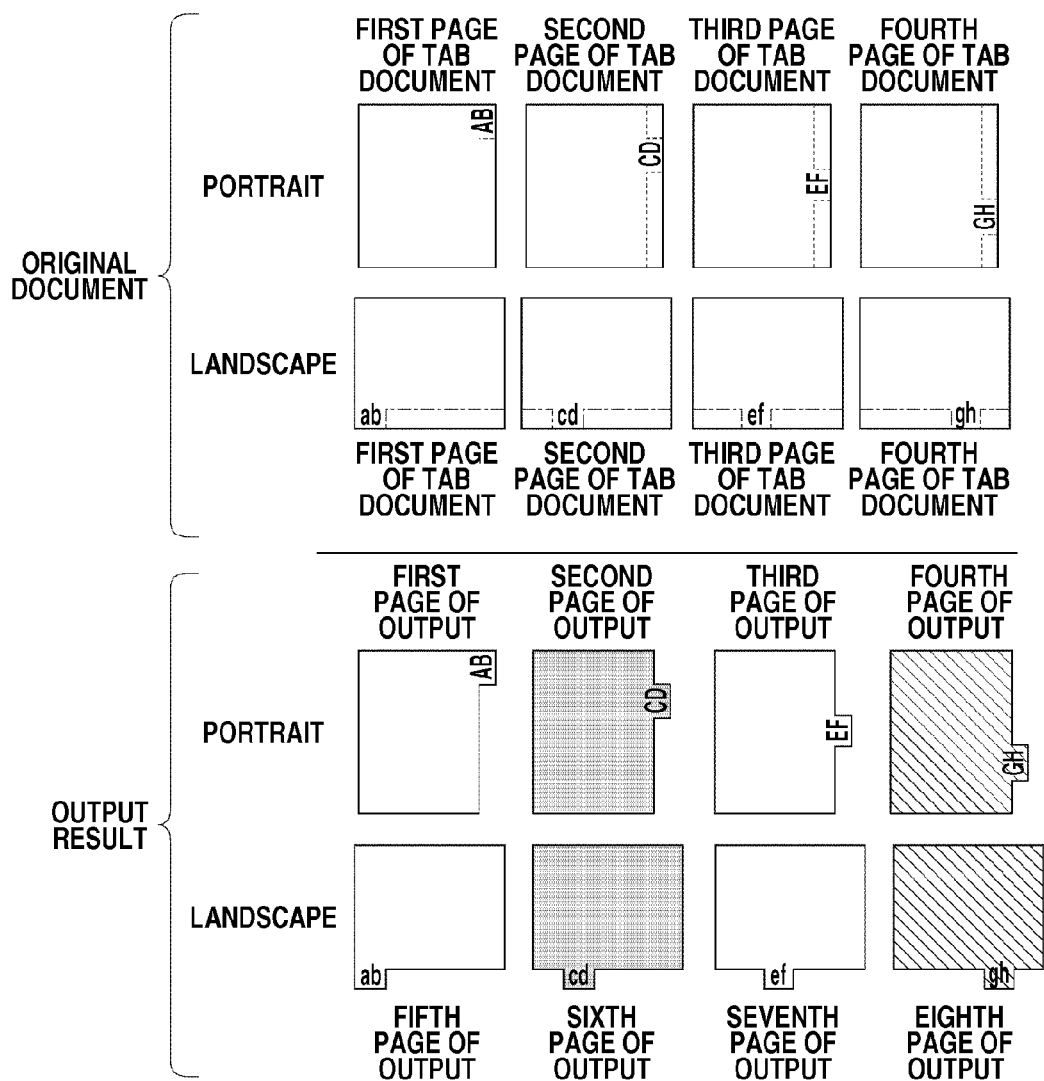
FIG. 11 illustrates an output result.

FIG. 10 is a flowchart illustrating a process performed when the image forming apparatus 106 receives a tab sheet print instruction from the user. In step S1001, upon detecting that the user has caused the scanning unit 201 of the image forming apparatus 106 to read the document, the main body control unit 202 acquires and stores in the storage device the document as image data. In step S1002, the main body control unit 202 acquires and stores in the storage device the print setting information that the user has input to the operation unit 205. In step S1003, if the main body control unit 202 detects that the print setting information does not include the tab sheet printing instruction (NO in step S1003), the process proceeds to step S1004. In step S1004, the main body control unit 202 prepares for printing using normal sheets. On the other hand, if the main body control unit 202 detects that the print setting information includes the tab sheet printing instruction (YES in step S1003), the process proceeds to step S1005.

In step S1005, the main body control unit 202 determines, based on the print setting information, the type of the tab sheets to be used in printing. If the tab order set by the user on the tab order registration screen 505 is the ascending order (ASCENDING ORDER in step S1005), the process proceeds to step S1006. In step S1006, the main body control unit 202 prepares for printing using the ascending order tab sheets. If the tab order set by the user on the tab order registration screen 505 is the descending order (DESCENDING ORDER in step S1005), the process proceeds to step S1007. In step S1007, the main body control unit 202 prepares for printing using the descending order tab sheets. If the user has selected "automatic selection" for the tab order setting (AUTOMATIC SELECTION in step S1005), the process proceeds to step S1008. In step S1008, the main body control unit 202 determines the tab sheet type based on the image orientation information acquired in step S1001 and the binding position information of the printing sheets acquired in step S1002. The main body control unit 202 then prepares for printing using the ascending order tab sheets or the descending order tab sheets.

In step S1009, the main body control unit 202 determines whether the sheets to be used in printing are available in the image forming apparatus 106. If there are no sheets available (NO in step S1009), the process proceeds to step S1010. In step S1010, the main body control unit 202 performs a sheet replenishment process in which a message that no printable sheets are available is displayed to the user. If the sheets are available (YES in step S1009), the process proceeds to step S1011. In step S1011, the image forming apparatus 106 starts printing. As a result, the tab sheets matching the user setting or the document image can be selected, so that an output result as illustrated in FIG. 11 is acquired.

The tab sheet print setting when performing PDL printing according to a second exemplary embodiment of the present invention will be described below with reference to FIGS. 12, 13, 14A, and 14B.

Figure 12:
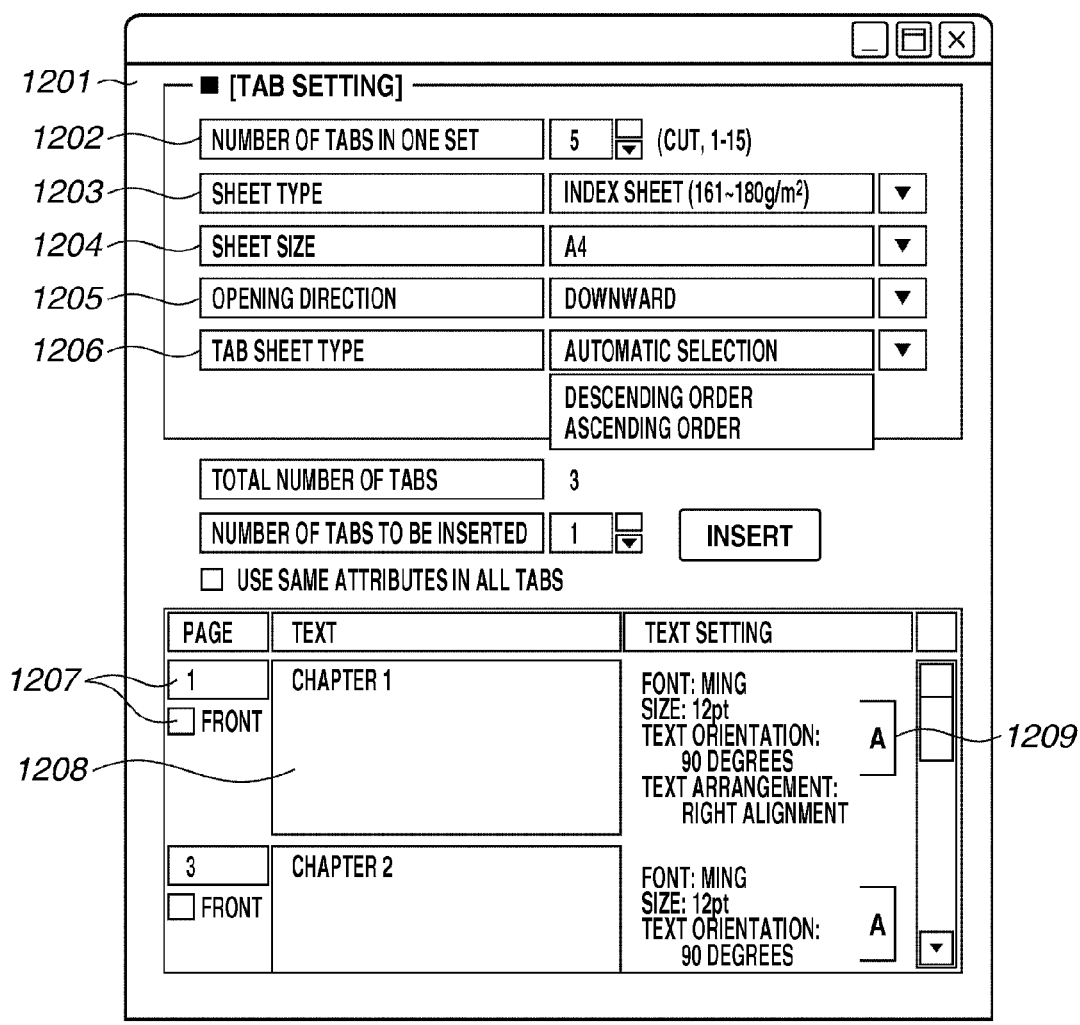
FIG. 12 illustrates a print setting of a printer in a client environment.

FIG. 12 illustrates a screen for specifying print settings of the printer in the client environment 104. Referring to FIG. 12, a setting screen 1201 includes boxes for setting a number of tabs in the tab sheets to be used 1202, a type of the sheet to be inserted 1203, a size of the sheet to be inserted 1204, a print orientation of the sheet to be inserted 1205, and a type of the tab sheet to be used in printing 1206. Further, the setting screen 1201 includes a tab portion inserting position information setting box 1207, a tab portion print text input box 1208, and a tab portion text setting box 1209. The setting screen 1201 which runs on the client PC in the end user environment A 104 converts the items that the user has selected thereon to print data and transmits the print data to the image forming apparatus 106. The number of tabs in the tab sheets to be used 1202, the type of the sheet to be inserted 1203, the size of the sheet to be inserted 1204, the print orientation of the sheet to be inserted 1205, and the type of the tab sheet to be used in printing 1206 are detailed settings of the tab sheet to be used in printing. The image forming apparatus 106 transmits the received detailed settings to the main body control unit 202 as the print setting information.

Figure 13:
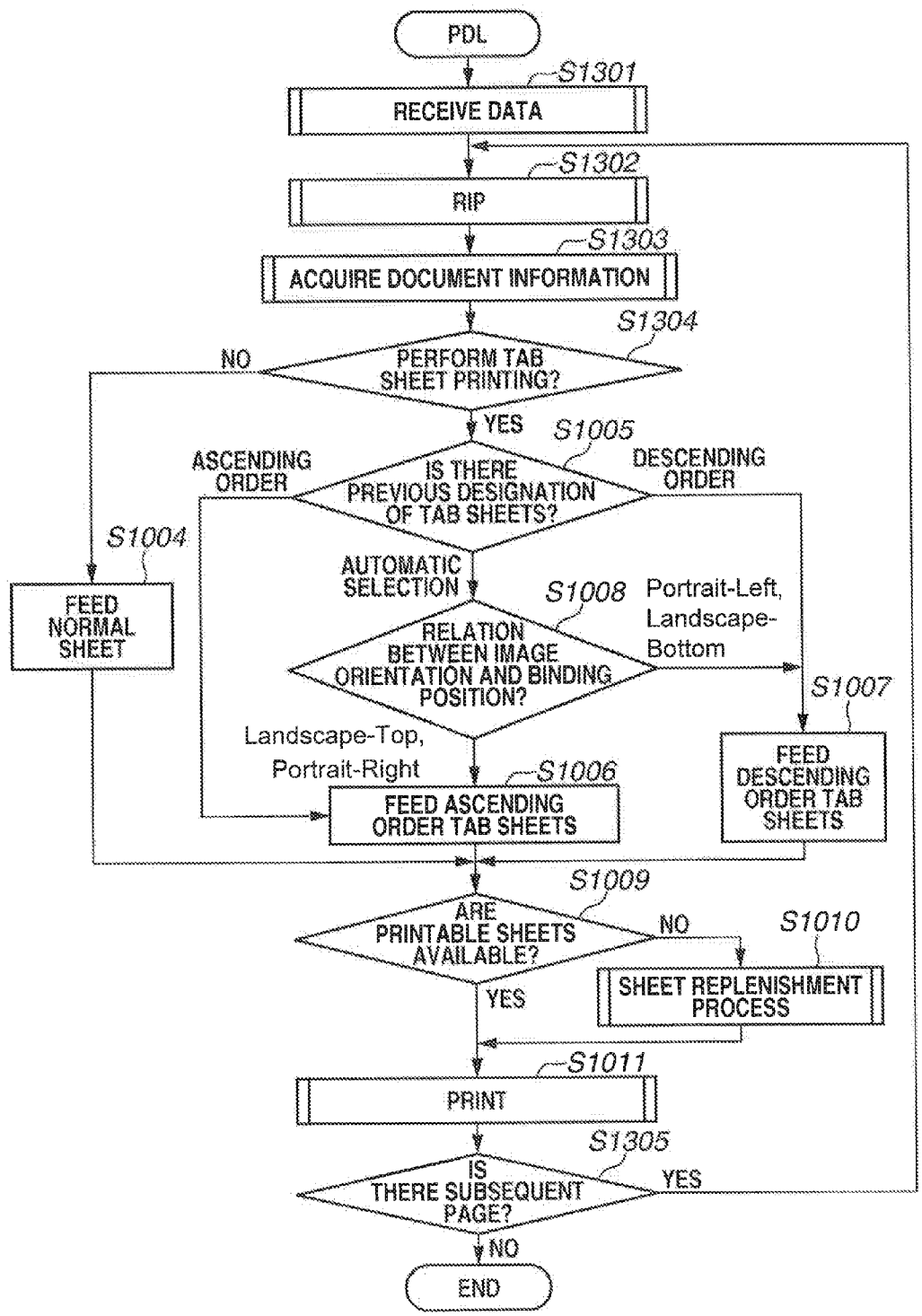
FIG. 13 is a flowchart illustrating a tab sheet printing process on a printer.

FIG. 13 is a flowchart illustrating a process for printing the tab sheet to be output from the printer. In step S1301, the image forming apparatus 106 receives the data transmitted from the client PC in the end user environment A 104. In step S1302, the image forming apparatus 106 transmits the received PDL data to the main body control unit 202, and the main body control unit 202 then performs raster image processing (RIP) on the PDL data. In step S1303, the main body control unit 202 acquires the print setting information acquired by performing RIP and stores the information in the storage device. The main body control unit 202 then starts printing page by page.

In step S1304, the main body control unit 202 detects whether the print setting information includes the tab sheet printing instruction. If the main body control unit 202 detects that the print setting information does not include the tab sheet printing instruction (NO in step S1304), the process proceeds to step S1004. In step S1004, the main body control unit 202 prepares for printing using normal sheets. On the other hand, if the main body control unit 202 detects that the print setting information includes the tab sheet printing instruction (YES in step S1304), the process proceeds to step S1005.

In step S1005, the main body control unit 202 determines, based on the print setting information, the type of the tab sheets to be used in printing. If the tab order set by the user on the tab order registration screen 505 is the ascending order (ASCENDING ORDER in step S1005), the process proceeds to step S1006. In step S1006, the main body control unit 202 prepares for printing using the ascending order tab sheets. If the tab order set by the user on the tab order registration screen 505 is the descending order (DESCENDING ORDER in step S1005), the process proceeds to step S1007. In step S1007, the main body control unit 202 prepares for printing using the descending order tab sheets. If the user has selected "automatic selection" for the tab order setting (AUTOMATIC SELECTION in step S1005), the process proceeds to step S1008. In step S1008, the main body control unit 202 determines the tab sheet type based on the image orientation information acquired in step S302 and the binding position information of the printing sheets acquired in step S1303. The main body control unit 202 then prepares for printing using the ascending order tab sheets or the descending order tab sheets.

Figure 14A:
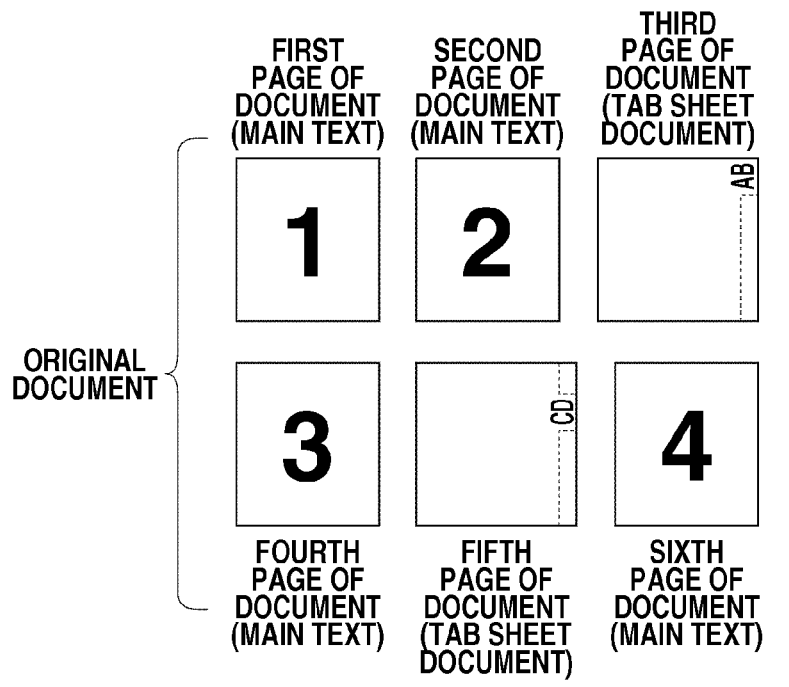
FIGS. 14A and 14B illustrate output results of a printer.
Figure 14A:
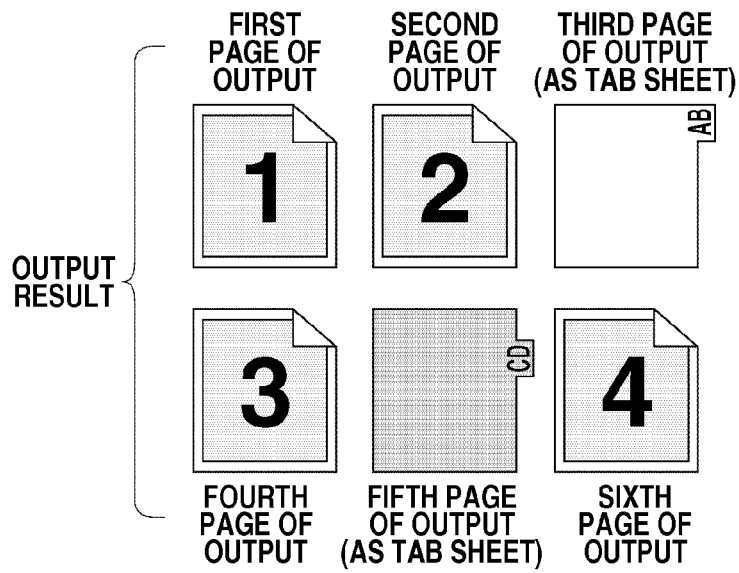
Figure 14B:
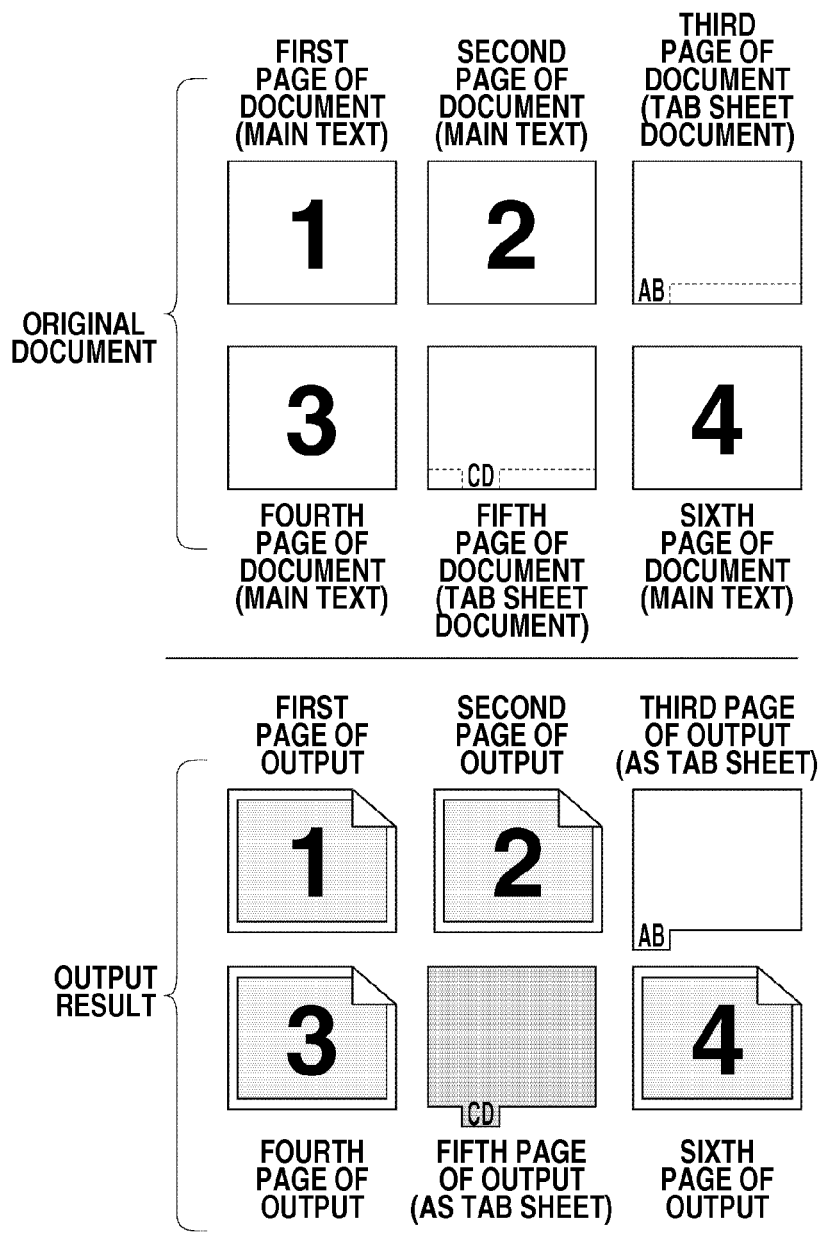

In step S1009, the main body control unit 202 determines whether the sheets to be used in printing are available in the image forming apparatus 106. If there are no sheets available (NO in step S1009), the process proceeds to step S1010. In step S1010, the main body control unit 202 performs a sheet replenishment process in which a message that no printable sheets are available is displayed to the user. If the sheets are available (YES in step S1009), the process proceeds to step S1011. In step S1011, the image forming apparatus 106 starts printing. In step S1305, the main body control unit 202 determines, when printing has ended, whether there is a subsequent page. If there is a subsequent page (YES in step S1305), the process returns to step S1302, and the process is repeated. If there is no subsequent page (NO in step S1305), the process ends. As a result, the tab sheets matching the user setting or the document image can be selected, so that an output result as illustrated in FIGS. 14A and 14B is acquired.

Figure 15A:
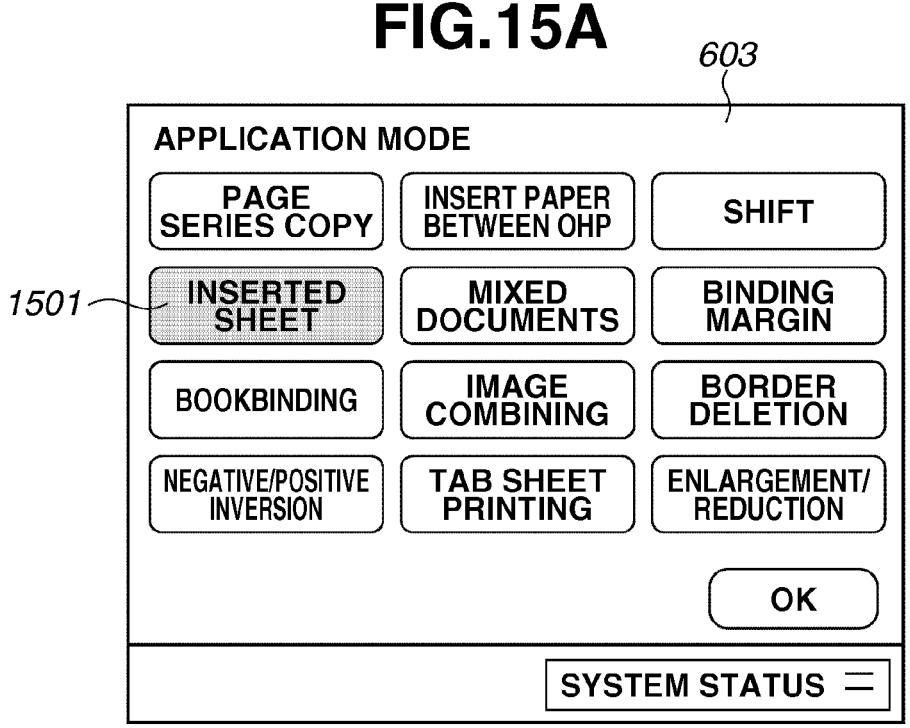
FIGS. 15A, 15B, and 15C illustrate an application print setting 2.

FIG. 15A illustrates an application print setting screen 2 according to a third exemplary embodiment of the present invention. Referring to FIG. 15A, the application print setting details screen 2 includes the application mode screen 603 and an inserted sheet printing setting key 1501.

Upon detecting that the user has selected the inserted sheet printing setting key 1501, the main body control unit 202 inserts in the image forming apparatus 106 the tab sheet which is not to be printed on. The main body control unit 202 then switches the screen displayed on the operation unit 205 to a tab sheet insertion setting list screen illustrated in FIG. 15B.

Figure 15B:
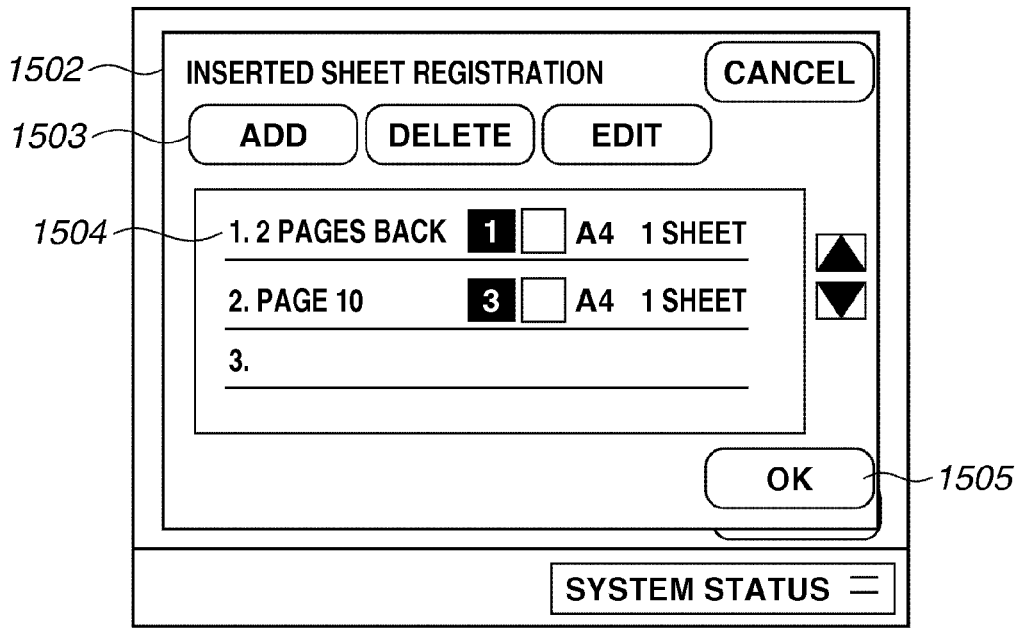

FIG. 15B illustrates a tab sheet insertion setting list details screen. Referring to FIG. 15B, a tab sheet insertion setting list screen 1502 includes add/delete/edit buttons 1503 and an OK button 1505. Upon detecting that the user has input the tab setting using the add/delete/edit buttons 1503 on the tab sheet insertion setting list screen 1502, the main body control unit 202 switches the screen displayed on the operation unit 205 to a tab sheet insertion registration setting details screen illustrated in FIG. 15C.

Figure 15C:
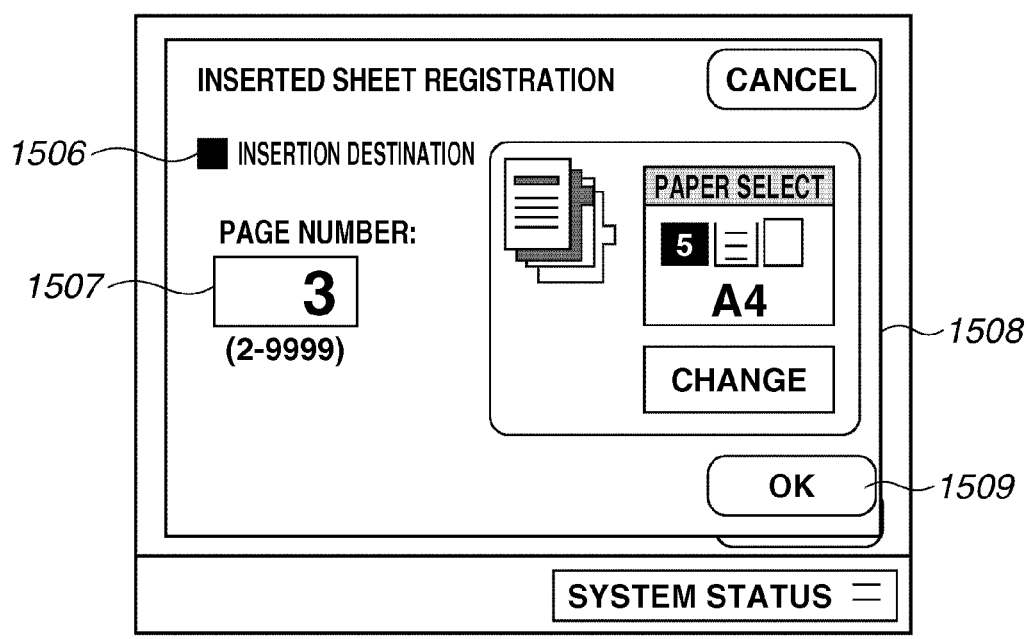

FIG. 15C illustrates a tab sheet insertion details setting screen. Referring to FIG. 15C, a tab sheet insertion details setting screen 1506 displays a sheet insertion position box 1507 and includes an inserted sheet feed stage setting button 1508 and an OK button 1509. Upon detecting that the user has input to the operation unit 205 insertion position information using the display of the sheet insertion position box 1507, the main body control unit 202 stores the input information as the insertion position information. Then, upon detecting that the user has selected a sheet feed stage unit for the tab sheets using the inserted sheet feed stage setting button 1508 via the operation unit 205, the main body control unit 202 stores information of the sheet feed stage unit as the inserted sheet feed stage information. When detecting that the OK button 1509 is pressed, the main body control unit 202 ends the registration process. Then, when the main body control unit 202 detects that the start key 302 on the operation unit 205 is pressed, the image forming apparatus 106 thus starts tab sheet insertion printing. When printing proceeds to the position registered in the insertion position information, the main body control unit 202 issues an instruction to insert the tab sheet according to the insertion sheet feed stage information. The image forming apparatus 106 then feeds the sheet from the predetermined sheet feed stage unit.

Figure 16:
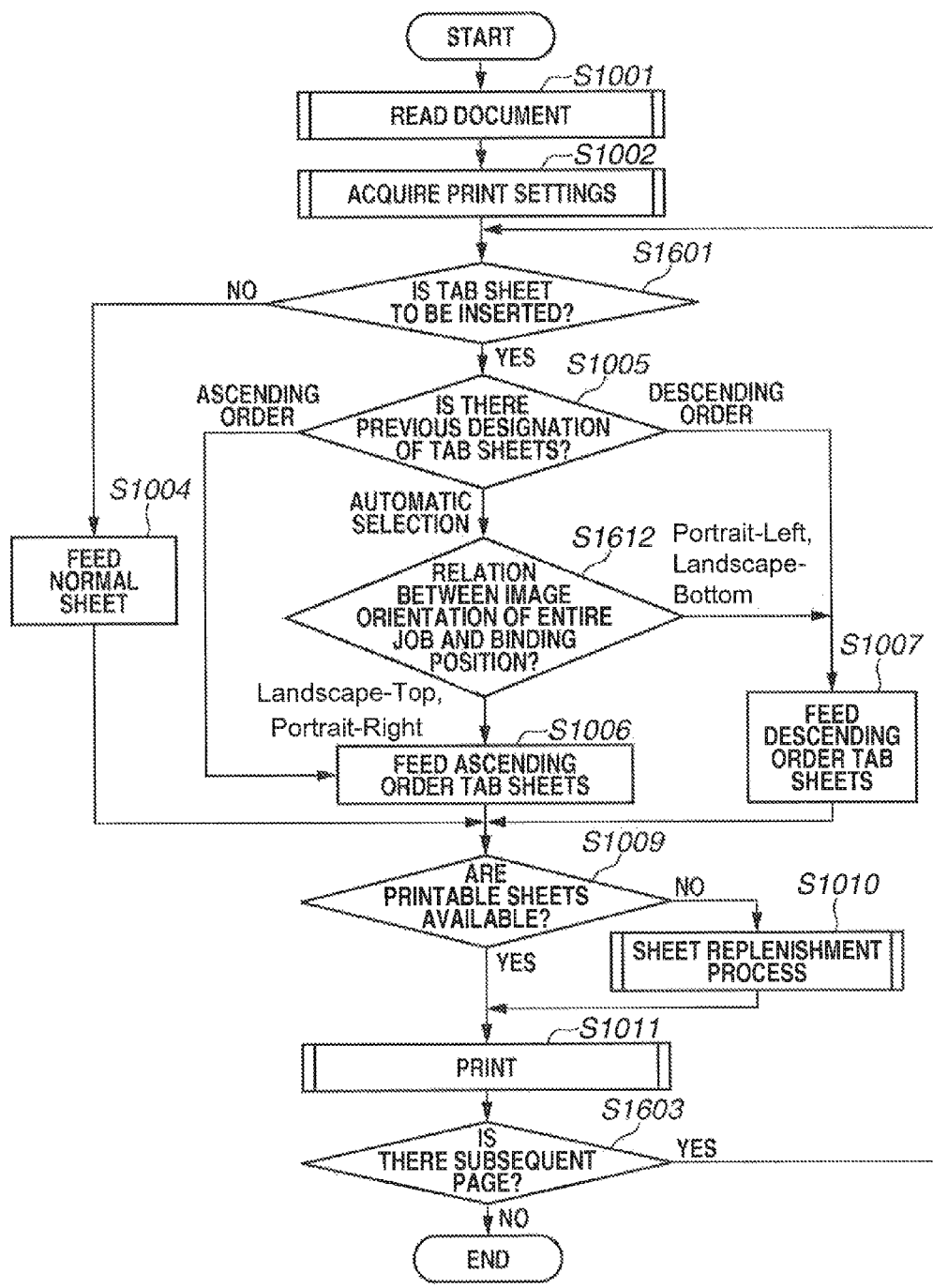
FIG. 16 is a flowchart illustrating an inserted tab sheet printing process.

FIG. 16 is a flowchart illustrating a process performed when receiving an instruction to perform tab sheet insertion printing from the user. In step S1001, upon detecting that the user has caused the scanning unit 201 in the image forming apparatus 106 to read the document, the main body control unit 202 acquires and stores in the storage device the document as the image data. In step S1002, the main body control unit 202 acquires and stores in the storage device the print setting information input from the operation unit 205.

In step S1601, the main body control unit 202 determines whether the print setting information includes a tab sheet insertion instruction. If the print setting information does not include the tab sheet insertion instruction (NO in step S1601), the process proceeds to step S1004. In step S1004, the main body control unit 202 prepares for printing using normal sheets. On the other hand, if the print setting information includes the tab sheet insertion instruction (YES in step S1601), the process proceeds to step S1005. In step S1005, the main body control unit 202 determines the type of tab sheets to be inserted based on the print setting information.

If the tab order set by the user on the tab order registration screen 505 is the ascending order (ASCENDING ORDER in step S1005), the process proceeds to step S1006. In step S1006, the main body control unit 202 prepares for printing using the ascending order tab sheets. If the tab order set by the user on the tab order registration screen 505 is the descending order (DESCENDING ORDER in step S1005), the process proceeds to step S1007. In step S1007, the main body control unit 202 prepares for printing using the descending order tab sheets. If the user has selected automatic selection as the tab order setting (AUTOMATIC SELECTION in step S1005), the process proceeds to step S1612. In step S1612, the main body control unit 202 determines the tab sheet type based on the image orientation information acquired in step S1001 and the binding position information of the printing sheets acquired in step S1002. Since the tab sheet insertion is a process in which the image forming apparatus 106 inserts in the printed output an unprinted tab sheet without printing on the tab sheet, the image orientation is determined based on the images of the entire print job. The main body control unit 202 thus determines the type of tab sheets based on the binding position of the printing paper and prepares for inserting the ascending order tab sheets or the descending order tab sheets.

Figure 17A:
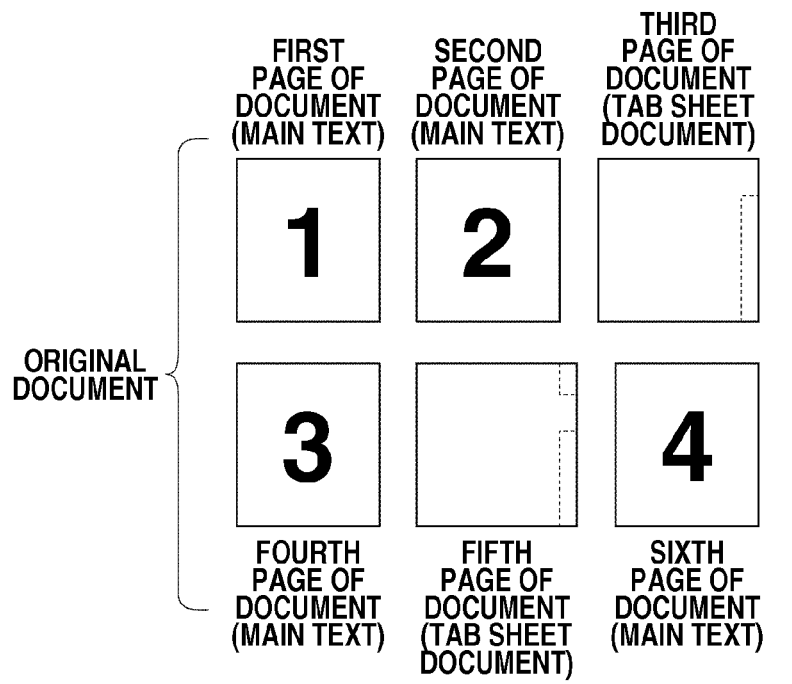
Figure 17A:
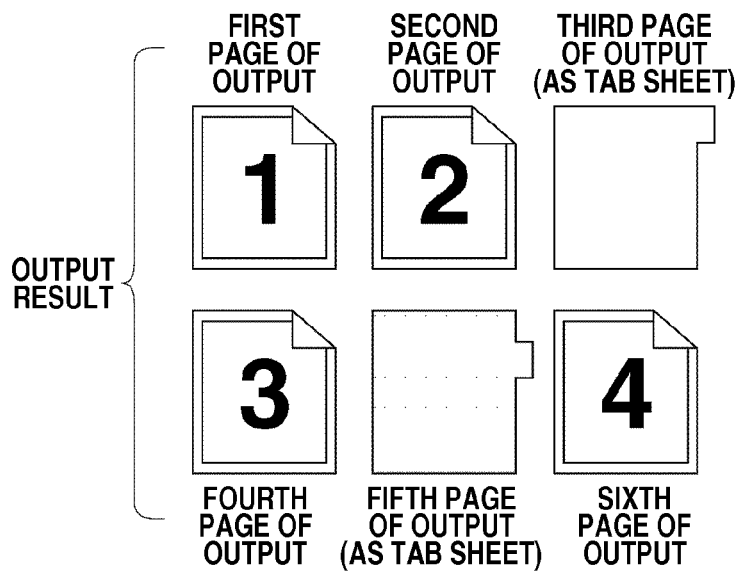

In step S1009, the main body control unit 202 determines whether the sheets to be used in printing or to be inserted are available in the image forming apparatus 106. If the sheets for printing and inserting are not available (NO in step S1009), the process proceeds to step S1010. In step S1010, the main body control unit 202 performs the sheet replenishment process in which a message that no printable or inserted sheets are available is displayed to the user. If the sheets to be used in printing and inserting are available (YES in step S1009), the process proceeds to step S1011. In step S1011, the image forming apparatus 106 starts printing. In step S1603, upon ending printing and inserting, the main body control unit 202 determines whether there is a subsequent page. If there is a subsequent page (YES in step S1603), the process returns to step S1601 and is then repeated. If there is no subsequent page (NO in step S1603), the process ends. As a result, the tab sheet matching the user setting or the document image can be inserted during the tab sheet insertion printing. An output result as illustrated in FIGS. 17A and 17B is thus acquired.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-288827 filed Dec. 21, 2009, which is hereby incorporated by reference herein in its entirety.

What is claimed is:

1. An image forming system comprising:
a receiving unit configured to receive an image;
an acquisition unit configured to acquire print setting information;
a detection unit configured to detect, if there is a tab sheet print command included in the acquired print setting information, an image orientation and a binding position of the image based on the received image and the acquired printer setting information;
a determination unit configured to determine whether an alignment order of tab sheets is an ascending order type or a descending order type based on the detected image orientation and binding position;
a sheet feeding unit configured to feed a tab sheet from a first sheet feeding unit in which tab sheets aligned in the ascending order have been set, if the alignment order determined by the determination unit is the ascending order type, and to feed a tab sheet from a second sheet feeding unit in which tab sheets aligned in the descending order have been set, if the alignment order determined by the determination unit is the descending order type; and
a printing unit configured to perform printing on the fed tab sheet,
wherein the image orientation is a portrait orientation or a landscape orientation.

2. The image forming system according to claim 1, wherein the image orientation is an orientation indicating a top or bottom of print data.

3. The image forming system according to claim 1, wherein the binding position is a position of a binding margin of print data.

4. A method for controlling an image forming system, the method comprising:
receiving an image;
acquiring print setting information;
detecting, if there is a tab sheet print command included in the acquired print setting information, an image orientation and a binding position of the image based on the received image and the acquired print setting information;
determining whether an alignment order of tab sheets is an ascending order type or a descending order type based on the detected image orientation and binding position;
feeding a tab sheet from a first sheet feeding unit in which tab sheets aligned in the ascending order have been set, if the determined alignment order is the ascending order type, and feeding a tab sheet from a second sheet feeding unit in which tab sheets aligned in the descending order have been set, if the alignment order determined is the descending order type; and
performing printing on the fed tab sheet,
wherein the image orientation is a portrait orientation or a landscape orientation.

5. The method according to claim 4, wherein the image orientation is an orientation indicating a top or bottom of print data.

6. A non-transitory computer-readable storage medium storing a program for causing a computer to executed the method according to claim 5.

7. The method according to claim 4, wherein the binding position is a position of a binding margin of print data.

8. A non-transitory computer-readable storage medium storing a program for causing a computer to executed the method according to claim 7.

9. A non-transitory computer-readable storage medium storing a program for causing a computer to execute the method according to claim 4.

* * * * *